US012713222B2

(12) United States Patent
Chen et al.

(10) Patent No.: US 12,713,222 B2
(45) Date of Patent: Aug. 18, 2026

(54) FAST NETWORK CAMPING WHEN MULTIPLE SIMS ARE OUT OF SERVICE

(71) Applicant: GOOGLE LLC, Mountain View, CA (US)

(72) Inventors: Edison Chen, Taipei (TW); Shih-Che Chou, Taipei (TW); Chih-Cheng Wang, New Taipei City (TW); Hsueh-Feng Hsieh, New Taipei City (TW)

(73) Assignee: GOOGLE LLC, Mountain View, CA (US)

( * ) Notice: Subject to any disclaimer, the term of this patent is extended or adjusted under 35 U.S.C. 154(b) by 309 days.

(21) Appl. No.: 18/560,516

(22) PCT Filed: Dec. 20, 2022

(86) PCT No.: PCT/US2022/053565
§ 371 (c)(1),
(2) Date: Nov. 13, 2023

(87) PCT Pub. No.: WO2023/122123
PCT Pub. Date: Jun. 29, 2023

(65) Prior Publication Data

US 2024/0259779 A1 Aug. 1, 2024

Related U.S. Application Data

(60) Provisional application No. 63/291,690, filed on Dec. 20, 2021.

(51) Int. Cl.
*H04W 8/00* (2009.01)
*H04W 8/18* (2009.01)

(52) U.S. Cl.
CPC .................................... *H04W 8/18* (2013.01)

(58) Field of Classification Search
CPC ....... H04W 8/18; H04W 48/18; H04W 88/06; H04W 48/16
See application file for complete search history.

(56) References Cited

U.S. PATENT DOCUMENTS 9,491,693 B1 * 11/2016 Chuttani ............... H04W 48/16
2015/0264640 A1 9/2015 Feng et al.
(Continued)

FOREIGN PATENT DOCUMENTS

AU 2021101069 A4 4/2021
EP 3148257 A1 3/2017
(Continued)

OTHER PUBLICATIONS

International Search Report and Written Opinion mailed Apr. 11, 2023 for PCT/US2022/053565, 13 pages.
(Continued)

*Primary Examiner* — MD K Talukder

(57) ABSTRACT

A user equipment (UE) device performs fast network camping when multiple SIMs of the UE device are out of service. A first software stack begins scanning for available networks and finds an available network at a frequency X. The first software stack decodes system information received from the available network at frequency X and determines that the available network is mapped to the SIM associated with a second software stack of the UE device. The first software stack signals the second software stack that an available network is mapped to the SIM associated with the second software stack at frequency X. In response to receiving the signal, the second software stack sends an attach request to the available network and completes a network attach procedure.

17 Claims, 4 Drawing Sheets

(56) References Cited

U.S. PATENT DOCUMENTS

| | | | | |
|---|---|---|---|---|
| 2016/0262200 | A1* | 9/2016 | Su | H04W 52/0209 |
| 2017/0127217 | A1* | 5/2017 | Miao | H04W 76/15 |
| 2018/0184309 | A1* | 6/2018 | Bhardwaj | H04W 72/542 |
| 2018/0234878 | A1* | 8/2018 | Anand | H04W 48/16 |
| 2024/0147216 | A1* | 5/2024 | Kim | H04W 8/183 |
| 2024/0259779 | A1* | 8/2024 | Chen | H04W 8/18 |
| 2025/0056388 | A1* | 2/2025 | Chen | H04W 48/16 |
| 2025/0063497 | A1* | 2/2025 | Kumar | H04W 4/90 |

FOREIGN PATENT DOCUMENTS

| | | | |
|---|---|---|---|
| WO | 2015180128 | A1 | 12/2015 |
| WO | 2017124327 | A1 | 7/2017 |

OTHER PUBLICATIONS

International Preliminary Report on Patentability mailed Jul. 4, 2024 for PCT/US2022/053565, 10 pages.

* cited by examiner

FAST NETWORK CAMPING WHEN MULTIPLE SIMS ARE OUT OF SERVICE

CROSS-REFERENCE TO RELATED APPLICATIONS

The present application is a U.S. National Stage under 35 U.S.C. § 371 of International Patent Application Serial No. PCT/US2022/053565, entitled "FAST NETWORK CAMPING WHEN MULTIPLE SIMS ARE OUT OF SERVICE" and filed on Dec. 20, 2022, which claims priority to U.S. Provisional Application No. 63/291,690, entitled "FAST NETWORK CAMPING WHEN MULTIPLE SIMS ARE OUT OF SERVICE" and filed on Dec. 20,2021, the entireties of which are incorporated by reference herein.

BACKGROUND

Some user equipment (UE) devices, such as mobile phones, wearable devices, and devices or modules in the manufacturing or automotive industry, include multiple subscriber identity modules (SIMs), which may for example be embedded SIMs (eSIMs), each of which is mapped to a different carrier network. When a UE device having multiple SIMs is in an out of service condition, such as airplane mode or when powering up, and requires an available network, a wireless cellular modem protocol software stack (referred to herein as a "software stack") of the UE device associated with one of the SIMs scans networks at a variety of frequencies for an available network mapped to the SIM. However, the search for an available network mapped to the SIM can be time-consuming.

BRIEF DESCRIPTION OF THE DRAWINGS

The present disclosure is better understood, and its numerous features and advantages are made apparent to those skilled in the art by referencing the accompanying drawings. The use of the same reference symbols in different drawings indicates similar or identical items.

DETAILED DESCRIPTION

Figure 1:
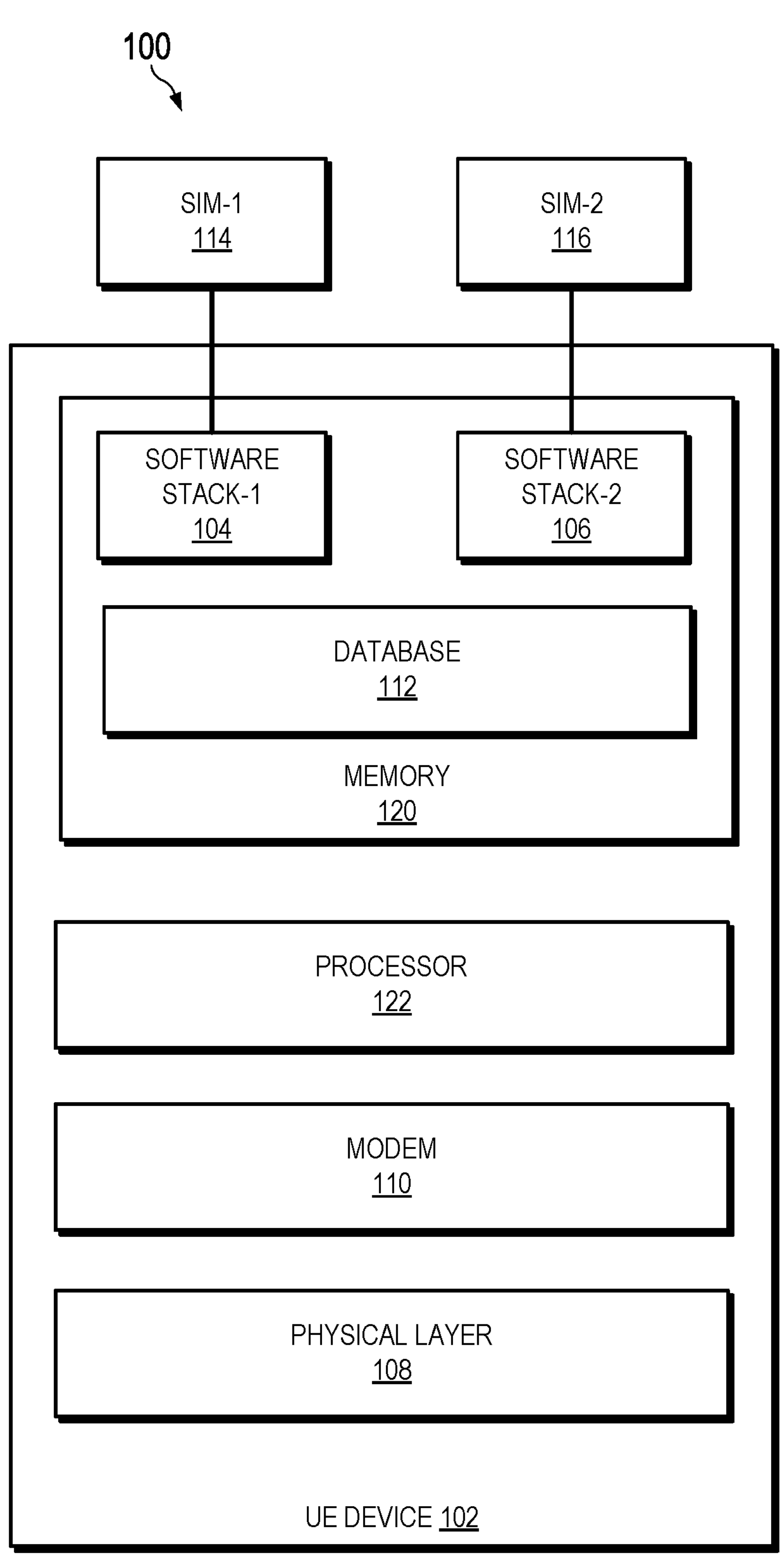
FIG. 1 is a block diagram of a UE device having multiple software stacks associated with SIMs that are mapped to different carrier networks configured to perform fast camping when multiple SIMs are out of service in accordance with some embodiments.

Typically, when a UE device (also referred to as a client device or UE) having multiple SIMs is in an out of service condition, such as airplane mode or when powering up, and requires an available network, a software stack associated with each SIM of the UE device will scan for available networks. The first software stack to get a radio resource from a lower layer of the UE device will begin network scanning, and while the first software stack scans for networks, no other software stack can scan for networks. The first software stack scans for available networks at a variety of allocated frequencies for an available network mapped to the SIM associated with the first software stack.

For example, the first software stack scans for available networks at a first frequency allocated to the first software stack, and if there is no available network associated with the SIM associated with the first software stack at the first frequency, the first software stack scans for available networks at a second frequency allocated to the first software stack. If there is no available network associated with the SIM associated with the first software stack at the second frequency, the first software stack scans for available networks at a third frequency allocated to the first software stack. The first software stack continues scanning at additional frequencies allocated to the first software stack until an available network mapped to the SIM associated with the first software stack is found or until all frequencies allocated to the first software stack have been scanned. Typically, if the first software stack scans a frequency and discovers an available network that is mapped to a SIM associated with a different software stack of the UE device, the first software stack determines that there is no available network mapped to the SIM associated with the first software stack at that frequency and continues scanning for an available network at the next allocated frequency. If the first software stack scans all its allocated frequencies and does not find an available network mapped to the SIM associated with the first software stack, the radio resource passes to a second software stack associated with a second SIM and the second software stack scans for available networks at a variety of allocated frequencies for an available network mapped to the second SIM associated with the second software stack.

FIGS. 1-4 illustrate techniques for faster network camping when multiple SIMs of a UE device are out of service or in a power-up condition. In some embodiments, a UE device that supports multiple software stacks, each associated with a SIM mapped to a particular carrier network, is out of service and requires fast camping on a network. A first software stack requests and receives a radio resource from a lower layer of the UE device. The first software stack begins scanning for available networks and finds an available network at a frequency X. The first software stack decodes system information such as a system information block (SIB) (for a 3G network) or a system information block1 (SIB1) (for a 4G/5GC network) received from the available network at frequency X and determines that the available network is mapped to the SIM associated with a different software stack of the UE device, referred to as software stack Y. In some embodiments, the first software stack signals software stack Y that an available network is mapped to the SIM associated with software stack Y at frequency X.

In response to receiving the signal, software stack Y sends a random-access channel (RACH) attach request to the available network and completes a network attach procedure. In some embodiments, a modem of the UE device supports radio frequency (RF) concurrency and processes the RACH attach request and network attach procedure while concurrently allowing the first software stack to continue scanning for available networks. In some embodiments in which the modem of the UE device does not support RF concurrency, the UE device prioritizes the RACH attach request for software stack Y and returns access to the radio resource to the first software stack to continue scanning for available networks after the network attach procedure for software stack Y has completed. In other embodiments in which the modem of the UE device does not support RF concurrency, the UE device performs the RACH attach request for software stack Y concurrently with continuing to scan for available networks for the first software stack by selecting a scanning frequency from a different frequency band range than the band range of frequency X.

By signaling software stack Y that a network mapped to the SIM associated with software stack Y is available at frequency X and supporting software stack Y sending a RACH attach request to the available network without waiting for the first software stack to finish scanning for available networks, the UE device enables faster camping on an available network, resulting in a reduced time to camp on an available network. For example, in some cases, full band scanning by a first software stack can take 45 seconds, whereas allowing another software stack to attach to a network if one is available within the full band scanning by the first software stack can reduce the time to camp on the available network by 22.5 seconds. Fast camping is particularly desirable in emergencies, such as when a user attempts to make an emergency call while the UE device is in airplane mode.

For ease of illustration, the following techniques are described in an example context in which one or more UE devices and Radio Access Networks (RANs) implement one or more radio access technologies (RATs) including at least a Fifth Generation (5G) New Radio (NR) standard (e.g., Third Generation Partnership Project (3GPP) Release 15, 3GPP Release 16, etc.) (hereinafter, "5G NR" or "5G NR standard"). However, it should be understood that the present disclosure is not limited to networks employing a 5G NR RAT configuration, but rather the techniques described herein can be applied to any combination of different RATs employed at the UE devices and the RANs. It should also be understood that the present disclosure is not limited to any specific network configurations or architectures described herein for implementing fast camping when multiple SIMs are out of service, but instead, techniques described herein can be applied to any configuration of RANs where a UE device can support an attach process for a second software stack to a network found by a first software stack scanning for available networks. Also, the present disclosure is not limited to the examples and context described herein, but rather the techniques described herein can be applied to any network environment where a UE device implements fast camping when multiple SIMs are out of service.

FIG. 1 is a block diagram 100 of a UE device 102 having multiple software stacks associated with SIMs that are mapped to different carrier networks configured to perform fast camping when multiple SIMs are out of service in accordance with some embodiments. In some embodiments, the UE device 102 is a personal computing device such as a mobile phone intended for use by a user and includes components normally used in connection with a personal computing device such as a processor 122, memory 120 storing data and instructions, a communication interface including a physical layer 108, a modem 110, a display (not shown), and user input (not shown). The UE 102 also includes a camera, speakers, a network interface device, and all of the components used for connecting these elements to one another in some embodiments.

The UE device 102 includes a first software stack, software stack-1 104, associated with a first SIM 114 that is mapped to a first carrier network (AT&T, in the illustrated example) and a second software stack, software stack-2 106, associated with a second SIM 116 that is mapped to a second carrier network (TMobile, in the illustrated example). The SIM may be a SIM card, an eSIM, or other suitable SIM platform/device. The UE device 102 uses the first software stack 104 and the second software stack 106 to effectuate multiple card communication functions. For example, the first software stack 104 manages communications between the UE device 102 and the first carrier network based on configurations of the first SIM 114, while the second software stack 106 manages communications between the UE device 102 and the second carrier network based on configurations of the second SIM 116. A user of the UE device 102 can communicate through one of the two carrier networks by placing a phone call through or receiving a phone call from either the first carrier network or the second carrier network. While two software stacks are included in the illustrated example, it will be appreciated that a UE device 102 may include more than two software stacks.

In some embodiments, the first software stack 104 and the second software stack 106 are implemented using software that is stored in a non-volatile memory included in the memory 120. When the UE device 102 is powered on, the processor 122 executes the software and performs the functions of the first software stack 104 and the second software stack 106. The memory 120 further includes a database 112 that stores a carrier list indicating which software stack of the UE device 102 is mapped to which carrier network.

The SIMs 114 and 116 may each for example be a SIM card that contains an integrated circuit and one or more suitable applications, such as a SIM application or a universal subscriber identification module (USIM) application, that enable the SIMs to support communication. In addition, each of the SIMs 114, 116 can store user application data, such as a phone book, and data related with mobile communication networks, such as international mobile subscriber identity (IMSI), temporary information related to the local network, multiple public land mobile network (PLMN) lists, wireless access technologies, carrier frequency information, and the like. A PLMN is a mobile communication network that is operated by a mobile network operator. A PLMN can use multiple wireless access technologies and include multiple types of mobile communication networks.

The UE device 102 further includes at least one modem 110 (also referred to as a baseband or baseband processor). The modem 110 includes one or more antennas (not shown) that enable the user device to communicate with carrier networks wirelessly. In some embodiments, the modem 110 communicates with one or more radios operating on a variety of frequencies simultaneously (e g., 700 MHz, 900 MHz, 2.4 GHz, 5.0 GHz etc.). The modem 110 includes various components to provide transmit and receive functions (a processor, memory, etc.). The modem 110 includes a radio frequency (RF) module (not shown) for receiving and transmitting signals. To receive signals, the RF module receives an RF signal from the air via an antenna and down converts the RF signal to a baseband signal that is sent to a signal processing circuit (not shown) for further processing. To transmit signals, the RF module up converts a baseband signal coming from the processing circuit to an RF signal and transmits it into the air.

The UE device 102 includes a physical layer 108 that provides hardware specifications for devices that communicate with each other. As such, the physical layer 108 establishes how devices connect to each other, assists in managing how communication resources are shared among devices, and the like.

Figure 2:
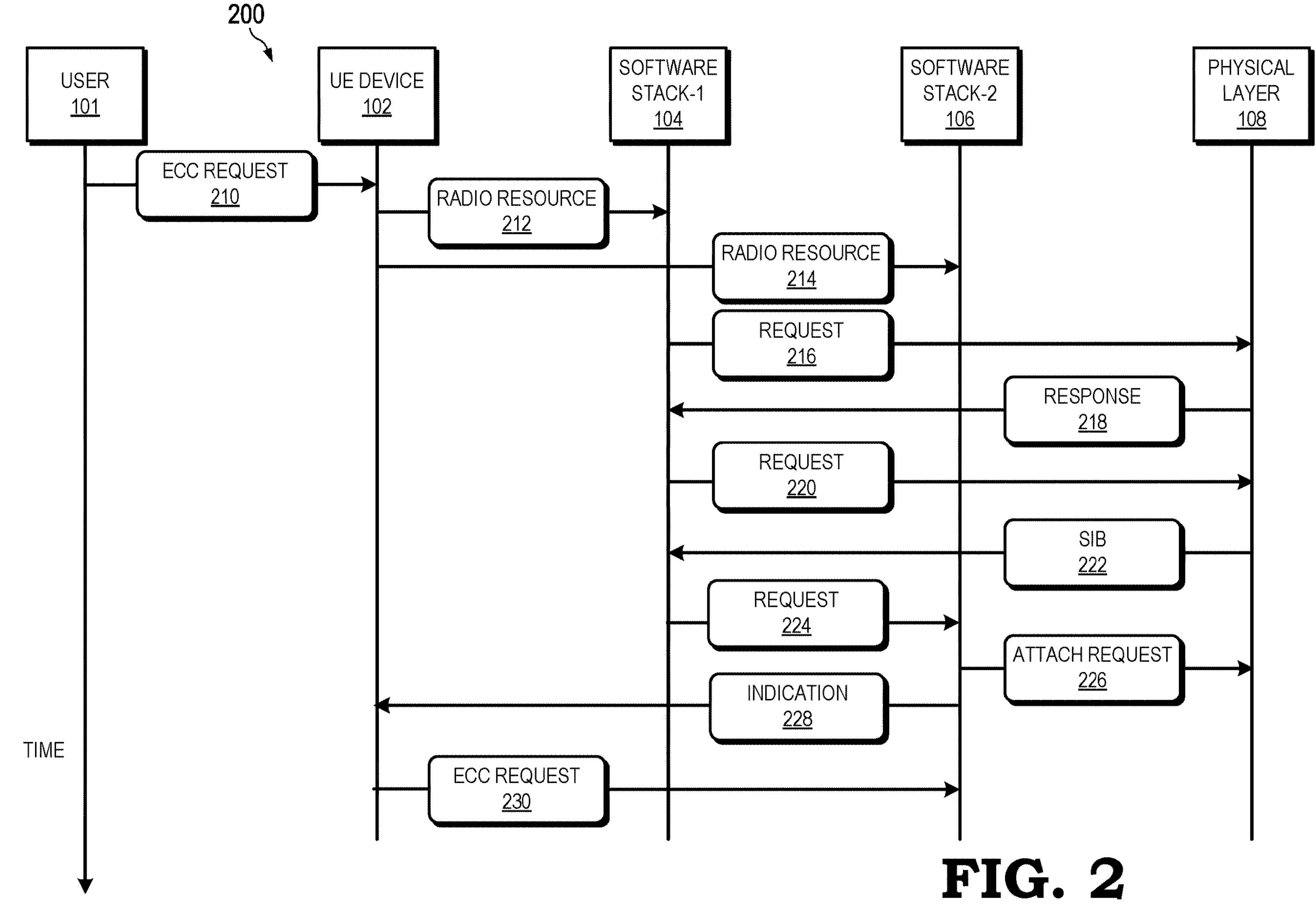
FIG. 2 is a diagram illustrating communications between software stacks of a UE device mapped to different carrier networks and a network in accordance with some embodiments.

FIG. 2 illustrates a process 200 by which the UE device 102 performs fast camping when multiple SIMs are out of service. In the illustrated example, airplane mode is enabled when a user 101 of the UE device 102 dials an emergency code (ECC) request 210 to make an emergency call. In response to the ECC request 210, the UE device 102 provides a radio resource 212 to the first software stack 104 and provides a radio resource 214 to the second software stack 106.

In the illustrated example, the first software stack 104 begins scanning for available networks. The first software stack 104 sends a first request 216 to scan at a first frequency. The physical layer 108 of the UE device 102 responds to the first request 216 with a response 218 that there is no available network at the first frequency. The first software stack 104 then sends a second request 220 to scan at a second frequency. The physical layer 108 of the UE device 102 responds to the second request 220 with a system information block (SIB) 222 indicating that the TMobile network (which is mapped to the second SIM associated with the second software stack 106 in the illustrated example) is available at the second frequency. In response to the SIB 222 indicating that the network that is mapped to the second SIM associated with the second software stack 106 is available at the second frequency, the first software stack 104 sends a request 224 to the second software stack 106 to attach on the second frequency.

The second software stack 106 sends an attach request 226 at the second frequency. Once the attach procedure is complete, the second software stack 106 sends the UE device 102 an indication 228 that the second software stack 106 is in service. In response to receiving the indication 228 that the second software stack 106 is in service, the UE device 102 dials an ECC request 230 in the second software stack 106.

By signaling the second software stack 106 that the network that is mapped to the second SIM associated with the second software stack 106 is available with the request 224 during network scanning by the first software stack 104 and allowing the second software stack 106 to send an attach request 226, rather than waiting for the first software stack 104 to complete network scanning at all of the frequencies allocated to the first software stack 104, the UE device 102 expedites camping on the available network.

Figure 3:
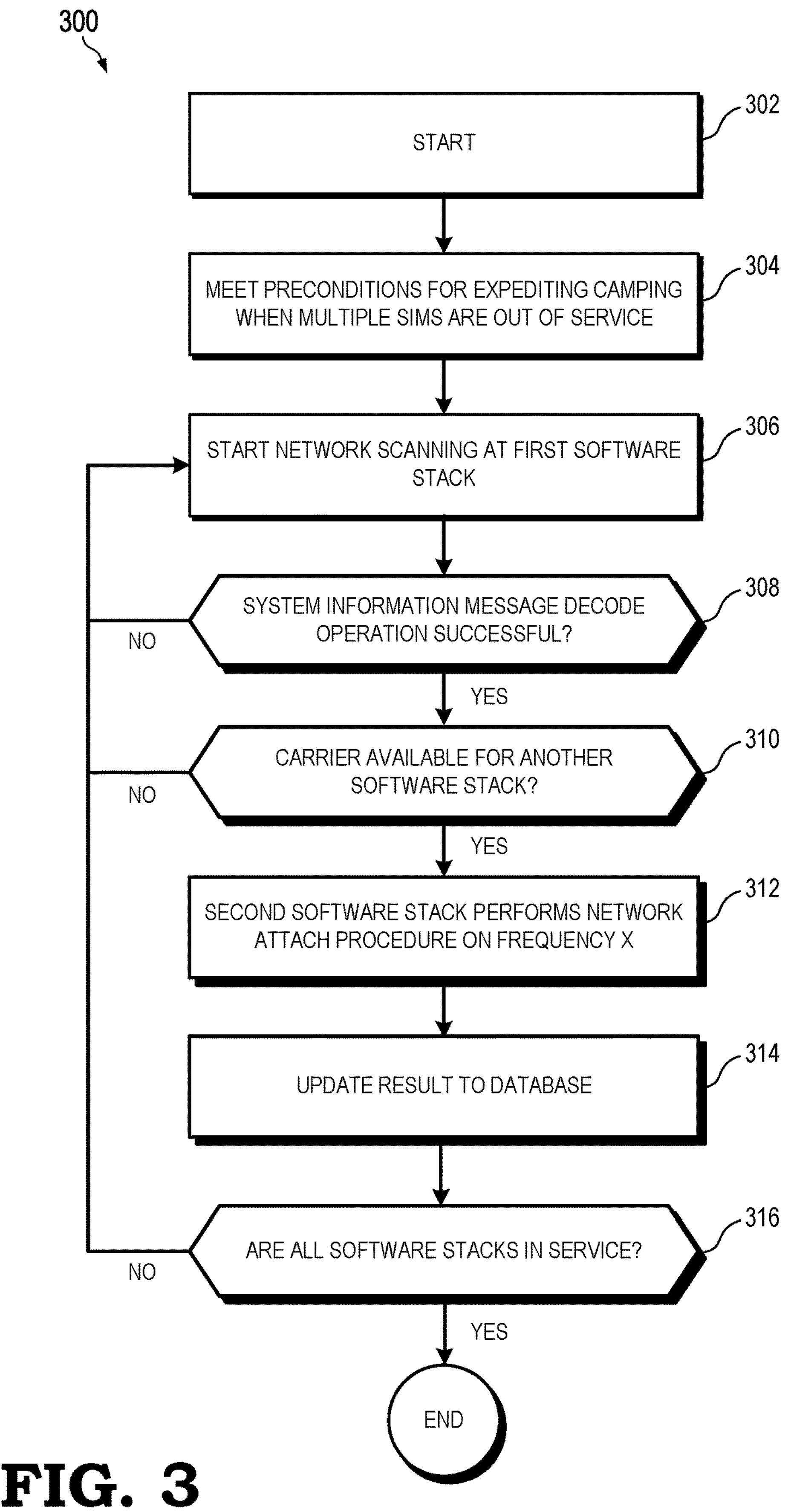
FIG. 3 is a flow diagram illustrating a method of expediting camping on a network when multiple SIMs of a UE device are out of service in accordance with some embodiments.

FIG. 3 is a flow diagram illustrating a method 300 of expediting camping on a network when multiple SIMs of a UE device are out of service in accordance with some embodiments. At block 302, the method begins. At block 304, pre-conditions for expediting camping on a network when multiple SIMs of the device are out of service are met. For example, the UE device 102 must support multiple software stacks, each of which is associated with a SIM (i.e., multiple modem stacks). As another example, one of the software stacks starts network scanning, and fast camping is required. An example of a scenario when fast camping is required is when the UE device is in airplane mode and a user initiates an emergency call by dialing an ECC request such as ECC request 210 of FIG. 2. In this scenario, the UE device 102 modem 110 will enable all software stacks to find available networks as soon as possible.

At block 306, a first software stack (e.g., software stack-1 104) starts network scanning. At block 308, after finding an available network in frequency X, the UE device 102 decodes a system information message. The system information message includes information identifying the carrier network that sent the system information message. For example, the system information message for the 3G network is a system information block (SIB). The system information message for the 4G/5GC networks is SIB1. If the decode operation fails, the method flow returns to block 306. If the decode operation passes, the method flow continues to block 310. At block 310, the first software stack 104 performs a carrier information check. In some embodiments, the first software stack 104 retrieves carrier information from the database 112 that stores a carrier list indicating which software stack of the UE device 102 is mapped to which carrier network. If the first software stack 104 determines during the carrier information check that there is no available carrier or that the software stack to which the carrier network identified in the system information message is in service, the method flow returns to block 306. If, at block 310, the first software stack 104 determines that the software stack-2 106 is mapped to the carrier network identified in the system information message and that software stack-2 106 is still out of service, the method flow continues to block 312.

At block 312, the software stack-2 106 initiates a network attach procedure on frequency X to the carrier network identified in the system information message. In some embodiments, the second software stack 106 sends a random-access channel (RACH) request and performs a contention-based random access (CBRA) attach procedure. For example, if the second software stack 106 is associated with a SIM mapped to AT&T, the UE device 102 sends a RACH request on frequency X if the 4G SIB1 MCC/MNC belongs to AT&T's range and the software stack-2 106 is in an out of service state. A CBRA attach procedure includes the UE device 102 sending a random access preamble to the network, in response to which the network sends a random access response. The UE device 102 then sends a scheduled physical uplink shared channel (PUSCH) transmission to the network, after which the network sends a contention resolution message such as a physical downlink control channel (PDCCH) message or a physical downlink shared channel (PDSCH) message. Once the network attach procedure has been completed, at block 314, the attach result is updated to the database 112 and the method flow continues to block 316. At block 316, the UE device 102 determines if all software stacks of the UE device 102 are in service. If scanning is still required for other software stacks of the UE device 102, the method flow returns to block 306. If all software stacks of the UE device 102 are in service, the method ends.

Figure 4:
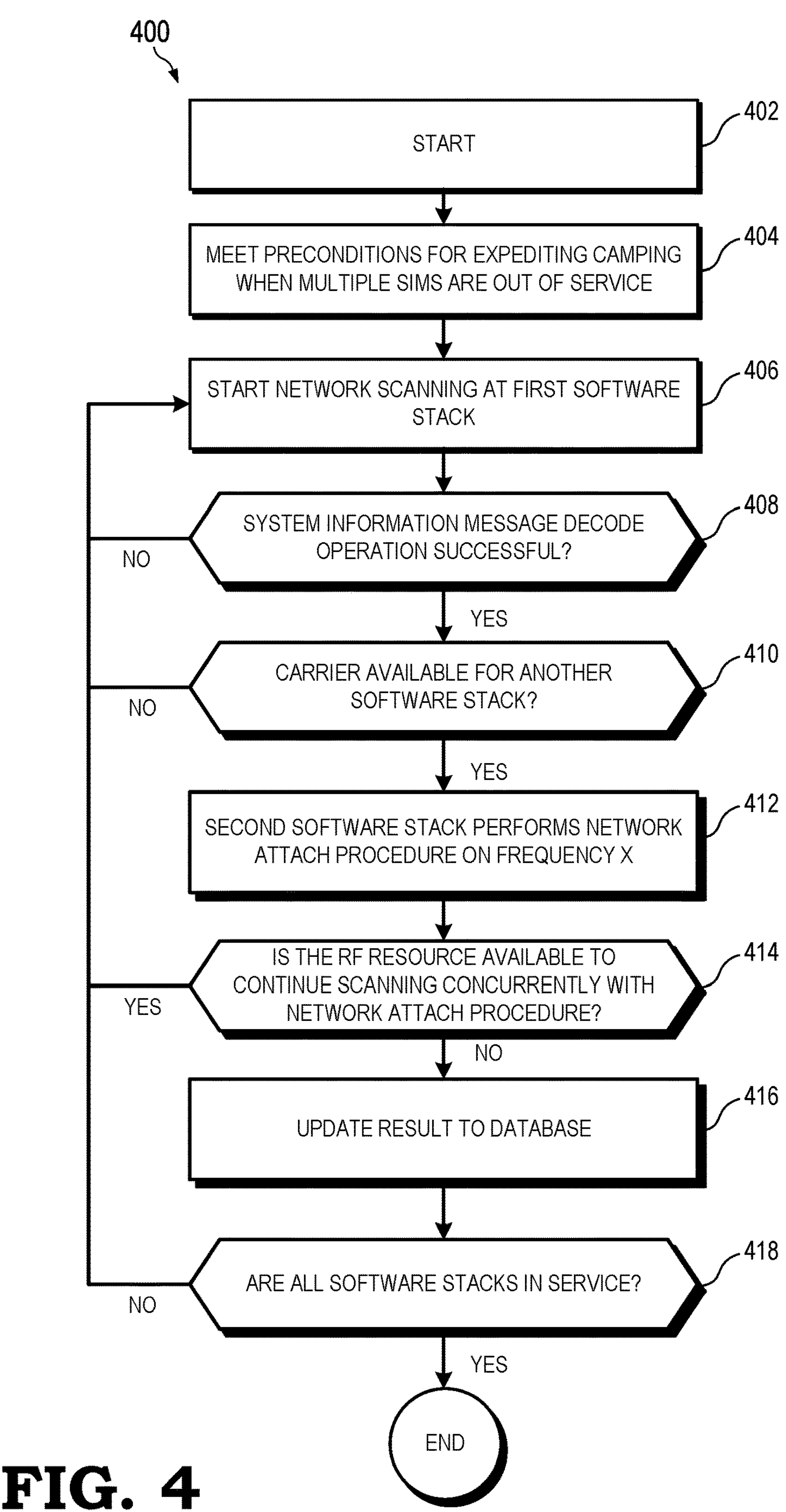
FIG. 4 is a flow diagram illustrating a method of continuing to scan for networks at a first software stack while a second software stack performs a network attach procedure in accordance with some embodiments.

FIG. 4 is a flow diagram illustrating a method 400 of continuing to scan for networks at a first software stack while a second software stack performs a RACH attach request in accordance with some embodiments. At block 402, the method begins. At block 404, pre-conditions for expediting camping on a network when multiple SIMs of the device are out of service are met.

At block 406, the first software stack 104 starts network scanning. At block 408, after finding an available network in frequency X, the UE device 102 decodes a system information message. If the decode operation fails, the method flow returns to block 406. If the decode operation passes, the method flow continues to block 410. At block 410, the first software stack 104 performs a carrier information check. In some embodiments, the first software stack 104 retrieves carrier information from the database 112 that stores a carrier list indicating which software stack of the UE device 102 is mapped to which carrier network. If the first software stack 104 determines during the carrier information check of block 410 that there is no available carrier or that the software stack to which the carrier network identified in the system information message is in service, the method flow returns to block 406. If, at block 410, the first software stack 104 determines that a second software stack 106 ("software stack Y") is mapped to the carrier network identified in the system information message and that second software stack 106 is still out of service, the method flow continues to block 412.

At block 412, the second software stack 106 initiates a network attach procedure on frequency X to the carrier network identified in the system information message by sending a RACH request and performing a contention-based random access (CBRA) attach procedure. If the RF resource 212 is available to continue network scanning for the first software stack 104 concurrently with the second software stack 106 sending the RACH request on frequency X, the method flow branches to return to block 406 for the first software stack 104 to perform network scanning while the second software stack 106 performs the network attach procedure. If the RF resource 212 is not available to continue network scanning for the first software stack 104 concurrently with the second software stack 106 sending the RACH request on frequency X, the method flow continues to block 416. At block 416, once the network attach procedure for the second software stack 106 has been completed, the attach result is updated to the database 112. At block 418, the UE device 102 determines if all software stacks of the UE device 102 are in service. If scanning is still required for other software stacks of the UE device 102, the method flow returns to block 306. If all software stacks of the UE device 102 are in service, the method ends.

Thus, if the UE device 102 modem supports RF concurrency, the UE device 102 processes the RACH request and attach procedure for the second software stack 106 concurrently with network scanning for the first software stack 104. If the UE device 102 modem does not support RF concurrency, in some embodiments, the UE device 102 prioritizes processing the RACH request and attach procedure for the second software stack 106, and then processes network scanning for the first software stack 104 after the attach procedure for the second software stack 106 has completed.

In some embodiments in which the UE device 102 modem does not support RF concurrency, the UE device 102 performs the attach procedure and network scanning concurrently by processing requests that are in different frequency bands concurrently. For example, if frequency A is mid-band, frequencies B and C are low-band, frequencies A and B are both in the network scanning list of the first software stack 104, and the second software stack 106 processes a RACH request on frequency C, the first software stack 104 prioritizes scanning frequency A. By prioritizing frequency A, which is mid-band, for network scanning, network scanning can be performed concurrently with processing the RACH request on frequency C, which is low-band.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium may be in source code, assembly language code, object code, or another instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skills in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method in a user equipment (UE) including a first software stack associated with a first subscriber module (SIM) and a second software stack associated with a second SIM, comprising:

in response to detecting at least one of an out of service or power-up condition, the UE scanning for the first software stack a plurality of frequencies of a first carrier network associated with the first SIM;

in response to the first software stack retrieving carrier information at a first scanned frequency indicating that a carrier network associated with the second SIM associated with the second software stack of the UE is available at the first scanned frequency, indicating to the second software stack to initiate a network attach procedure from the second software stack at the first scanned frequency; and continuing scanning the plurality of frequencies for the first carrier network for the first software stack while the second software stack initiates the network attach procedure.

2. The method of claim 1, further comprising:

initiating the network attach procedure for the second software stack in response to identifying at the first software stack that the carrier network associated with the second SIM associated with the second software stack of the UE is available.

3. The method of claim 1, further comprising:

continuing scanning the plurality of frequencies for the first carrier network for the first software stack after the second software stack processes the network attach procedure.

4. The method of claim 1, wherein continuing scanning is in response to a modem of the UE supporting radio frequency concurrency.

5. The method of claim 1, wherein continuing scanning comprises scanning a subset of the plurality of frequencies, the subset comprising frequencies in a first frequency band range different from a frequency band range of the first scanned frequency.

6. The method of claim 5, further comprising:

in response to the first software stack retrieving carrier information at a scanned frequency indicating that a carrier network associated with a third SIM associated with a third software stack of the UE is available, initiating a network attach procedure from the third software stack at the scanned frequency.

7. A user equipment (UE) comprising:

a memory to store a first software stack associated with a first subscriber module (SIM) and a second software stack associated with a second SIM; and a processor to:

in response to detecting at least one of an out of service or power-up condition, scan for the first software stack a plurality of frequencies for a first carrier network associated with the first SIM;

in response to the first software stack retrieving carrier information at a first scanned frequency indicating that a carrier network associated with the second SIM associated with the second software stack is available at the first scanned frequency, indicate to the second software stack to initiate a network attach procedure from the second software stack at the first scanned frequency; and continue scanning the plurality of frequencies for the first carrier network at the first software stack while the second software stack initiates the network attach procedure.

8. The UE of claim 7, wherein the processor is further to:

initiate the network attach procedure for the second software stack in response to identifying at the first software stack that the carrier network associated with the second SIM associated with the second software stack of the UE is available.

9. The UE of claim 7, wherein the processor is further to:

continue scanning the plurality of frequencies for the first carrier network at the first software stack after the second software stack processes the network attach procedure.

10. The UE of claim 7, further comprising:

a modem configured to support radio frequency concurrency.

11. The UE of claim 7, wherein the processor is further to:

scan a subset of the plurality of frequencies, the subset comprising frequencies in a first frequency band range different from a frequency band range of the first scanned frequency.

12. The UE of claim 11, wherein the memory is further to store:

a third software stack associated with a third SIM associated with a third carrier network; and wherein the processor is further to:

in response to the first software stack retrieving carrier information at a scanned frequency indicating that the third carrier network is available, initiate a network attach procedure from the third software stack at the scanned frequency.

13. A non-transitory computer-readable medium embodying a set of executable instructions, the set of executable instructions to manipulate at least one processor to:

in response to detecting at least one of an out of service or power up condition in a user equipment (UE) including a first software stack associated with a first subscriber module (SIM) and a second software stack associated with a second SIM, scan for the first software stack a plurality of frequencies of a first carrier network associated with the first SIM;

in response to the first software stack retrieving carrier information at a scanned frequency indicating that a carrier network associated with the second SIM associated with the second software stack is available at the scanned frequency, indicate to the second software stack to initiate a network attach procedure from the second software stack at the scanned frequency; and continue scanning the plurality of frequencies for the first carrier network for the first software stack while the second software stack initiates the network attach procedure.

14. The non-transitory computer-readable medium of claim 13, wherein the set of executable instructions are further to manipulate the at least one processor to:

initiate the network attach procedure for the second software stack in response to identifying at the first software stack that the carrier network associated with the second SIM associated with the second software stack of the UE is available.

15. The non-transitory computer-readable medium of claim 13, wherein the set of executable instructions are further to manipulate the at least one processor to:

continue scanning the plurality of frequencies for the first carrier network for the first software stack after the second software stack processes the network attach procedure.

16. The non-transitory computer-readable medium of claim 13, wherein the continued scanning is in response to a modem of the UE supporting radio frequency concurrency.

17. The non-transitory computer-readable medium of claim 16, wherein the set of executable instructions are further to manipulate the at least one processor to:

in response to the first software stack retrieving carrier information at a scanned frequency indicate that a carrier network associated with a third SIM associated with a third software stack of the UE is available, initiating a network attach procedure from the third software stack at the scanned frequency.

* * * * *